United States Patent [19]

Ohnari

[11] Patent Number: 4,686,379
[45] Date of Patent: Aug. 11, 1987

[54] NO-BREAK POWER SUPPLY SYSTEM

[75] Inventor: Eiji Ohnari, Fukuoka, Japan

[73] Assignee: Eikoh Giken Co., Ltd., Japan

[21] Appl. No.: 875,498

[22] Filed: Jun. 18, 1986

[30] Foreign Application Priority Data

Dec. 24, 1985 [JP] Japan .............................. 60-197366[U]
Jan. 14, 1986 [JP] Japan .................................... 61-3466

[51] Int. Cl.$^4$ ............................................... H02J 7/00
[52] U.S. Cl. ...................................................... 307/66
[58] Field of Search ....................... 307/64, 65, 66, 67, 307/68, 52, 60, 47, 78, 82, 84, 86; 317/26; 340/292

[56] References Cited

U.S. PATENT DOCUMENTS 3,714,452 1/1973 Williamson ........................ 307/64 X
4,400,626 8/1983 Lacy ...................................... 307/66

Primary Examiner—William M. Shoop, Jr.
Assistant Examiner—Sharon D. Logan
Attorney, Agent, or Firm—Toren, McGeady & Associates

[57] ABSTRACT

A no-break power supply system for use in a computer power supply source is disclosed. The system comprises a switch connected to a main or commerical power supply source and having first and second contacts, a first rectifier means connected to the switch through an overcurrent breaker, an inverter connected to the first rectifier means for supplying an output with constant voltage and constant frequency to a load, an emergency generator means connected to the switch for generating a supply voltage in the case of service interruption or failure of components, a second rectifier means connected in parallel with a series combination of the switch, the overcurrent breaker and the first rectifier, and a voltage relay means connected between the emergency generator means and the emergency battery means and for triggering the emergency generator means.

8 Claims, 3 Drawing Figures

NO-BREAK POWER SUPPLY SYSTEM

BACKGROUND OF THE INVENTION

The present invention relates to a no-break power supply system for supplying a power to a load in the case of service interuption, more particularly, to an apparatus for protecting a battery provided in the power supply system when components provided therein are broken down.

Such a conventional no-break power supply system is shown in FIG. 1. The system comprises an engine-generator E-G for supplying a power to a load L such as a computer or the like in the case of service interruption for long term, an undervoltage relay RY for detecting service interruption of commercial power supply source, an engine operating means or block PC arranged to receive the output of the relay RY for automatically starting and driving the engine E, a switch S having contacts a and b for selecting the commercial power supply and the engine generator, an overcurrent breaker NFB, a rectifier Rec which also serves as a floating charge device, a battery B connected to the rectifier Rec, and an inverter IV connected to the rectifier Rec and the battery B and having automatic voltage adjusting function.

In the system thus constructed, when components therein are operated correctly, the system operates normally without any trouble. When the system does not operate with the trouble or failure of the rectifier Rec or the trip of the breaker NFB due to any cause, the battery B discharges continuously until the voltage reaches the discharge final voltage, so that the system must be automatically stopped to operate by an automatic stop circuit (not shown) after reached the discharge final voltage. Under this condition, it is necessary for the battery B to take too much time for restoring the charged condition, while the pole substance separation arises often so that life time of the battery is decreased. Under this condition, moreover, sedimentation amount of the pole substance is increased so that sulfation is induced resulting in an exchange of the battery and thus an large expense.

Generally, the floating charge device for battery must be operated in such a manner that it does not affect property of the battery itself thereby increasing the life time thereof and utilizing the battery with stable conditons. To this end, constant voltage charging or constant current charging is usually utilized.

In operation, when service interruption occurred, the supply from commercial power source is immediately changed to the supply from the battery. In this case, when the battery itself has poorcapacity, overcharging current flows in the battery which serves as a load for the generator, so that the generator becomes overload condition.

If the capacity of the generator is increased it becomes expense and more overcurrent flows in the battery so that the above described pole substance separation arises therein, resulting in a decrease of the battery life-time.

SUMMARY OF THE INVENTION

It is an object of the present invention to eliminate the above described disadvantage of the conventional no-break power supply system.

It is another object of the present invention to provide a no-break power supply system capable of continuously supplying power to the load without stopping the system even in the case of failure or trouble of the system, thereby increasing reliability.

It is further object of the present invention to provide a no-break power supply system capable of supplying suitable charging current to the battery without increasing capacity of the generator.

According to the present invention, there is provided a no-break power supply system comprising a switch connected to a main or commercial power supply source and having first and second contacts, a first rectifier means connected to the switch through an overcurrent breaker, an inverter connected to the first rectifier means for supplying an output with constant voltage and constant frequency to a load, an emergency generator means connected to the switch for generating a supply voltage in the case of service interrution or failure of components, a second rectifier means connected in parallel with a series combination of the switch, the over-current breaker and the first rectifier, and a voltage relay means connected between the emergency generator means and the emergency battery means and for triggering the emergency generator means.

The emergency generator means comprises an engine-generator connected to the second contact of the switch, an engine operating means connected to the engine for driving the engine-generator, asnd an undervoltage relay connected between the main supply source and the engine operating means for triggering the engine operating means. The first and second rectifier means serve also as a floating charge means for the emergency battery means.

According to the present invention, there is also provided a no-break power supply system comprising a first rectifier means connected to a main or commercial supply source, an inverter connected to the first rectifier through an overcurrent breaker and for supplying an output with constant voltage and constant frequency to a load, an emergency generator means connected between the main supply source and the inverter for generating a supply voltage for long duration in the case of service interruption or failure of components, a floating charge means connected to a junction point of the first rectifier means, the emergency generator means and the inverter, an emergency battery means connected between the floating charge means and a ground for supplying a voltage for short duration in the case of service interruption or failure of components, and an undervoltage relay means connected between the emergency generator means and the emergency battery means for triggering the emergency generator means.

The emergency generator means comprises an engine-generator driven at speed two times the rated speed, an engine operating means connected to the engine for driving the engine-generator, an undervoltage relay connected between the main supply source and the engine operating means for triggering the engine operating means, a second rectifier means connected to the output of the generator, and a series combination of a first diode and an overcurrent breaker which is connected between the second rectifier means and the inverter. The floating charge means comprises a second diode connected between the inverter means and the emergency battery means with antipolarity, and a current limiter connected between the first rectifier means and the emergency battery means in such a manner that it is connected in parallel with the second diode, and a DC voltage meter connected to the current limiter.

DETAILED EXPLANATION OF THE PREFERRED EMBODIMENTS

Figure 1:
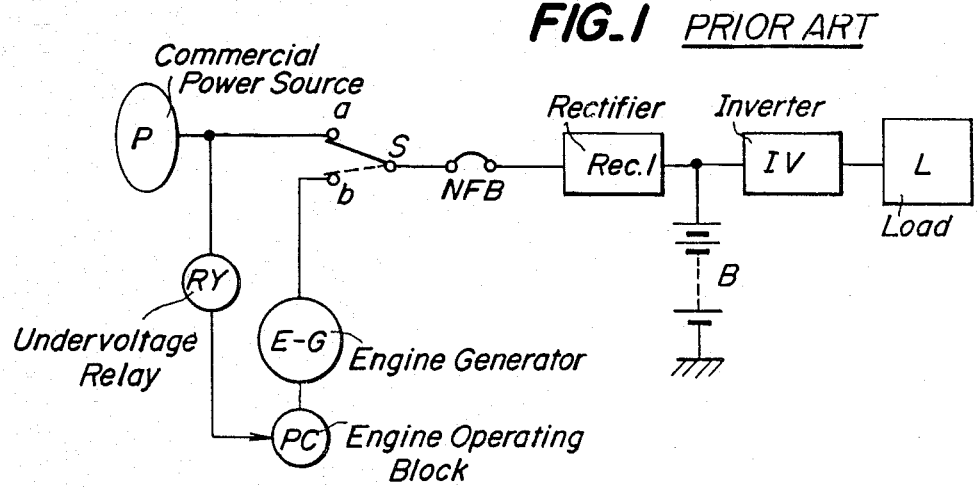
FIG. 1 is a block diagram showing a conventional no-break power supply system.
Figure 2:
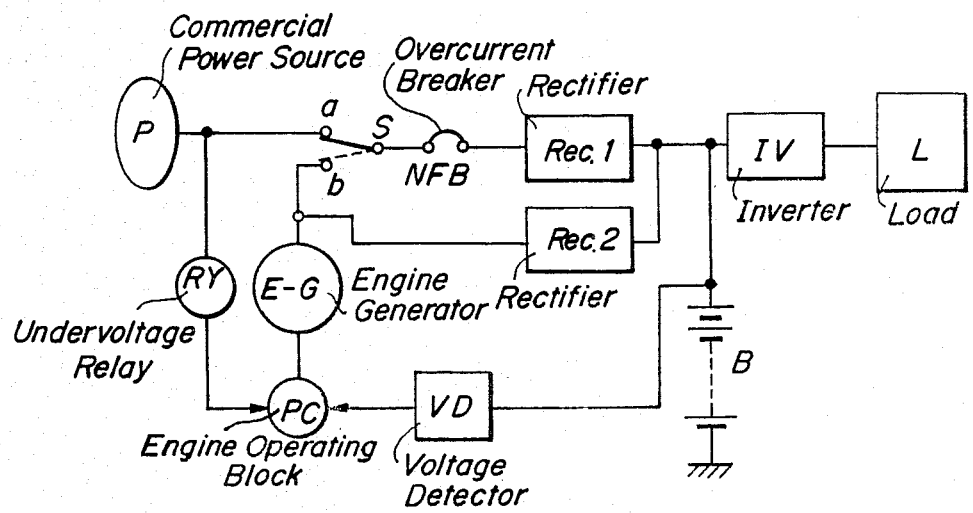
FIG. 2 is a block diagram showing one embodiment of a no-break power supply system according to the present invention.

Now to FIG. 2, there is shown one embodiment of a no-break power supply system according to the present invention. In FIG. 2, circuit elements or components corresponding to those in FIG. 1 bear the same reference numerals, and its constructional explanation is omitted.

In the present embodiment, the system comprises a second rectifier Rec 2 connected between the engine-generator E-G and the inverter IV in such a manner that it is connected in parallel with a series combination of the switch S, the overcurrent breaker NFB and the first rectifier Rec 1. The second rectifier Rec 2 has the same capacity as that of the first rectifier Rec 1. The system according to the present invention also comprises a voltage relay VD connected between the engine operating means PC and the floating battery B which has another pole plate connected to a ground. The voltage relay VD serves to always monitor the voltage of the battery B and supplies a triggering signal to the engine operating means PC only when the voltage of the battery B becomes lower than the set level.

In operation, as described above, the voltage of the battery B is always monitored by the voltage relay VD. If the input voltage of the inverter IV is decreased in comparison with a predetermined level due to a failure of the first rectifier Rec 1 or a malfunction disorder of the overcurrent breaker NFB, the battery B begins immediately to discharge so as to maintain the input voltage of the inverter IV to the predetermined level, so that the output voltage of the battery B beccomes gradually decreased. When the voltage of the battery B becomes lower than the set level the voltage relay VD supplies a triggering signal to the engine operating means PC so that it drives the engine-generator E-G which changes the switch S from its contact a to the contact b. The output of the engine-generator E-G is then supplied to the inverter IV through the second rectifier Rec 2, so that the inverter IV holds its output at normal condition.

When the input voltage of the inverter IV restores at normal condition the battery B is changed from the charging condition to the floating charge condition.

As soon as the voltage of the battery B reaches the predetermined level the voltage relay VD stops the supply of the signal to the engine operating means PC and then stops the engine-generator E-G after a predetermined time set by the engine operating means so that the switch S is returned to the connection to the contact a and thus the load is supplied by the main power supply source under the normal operation.

In the case of general service interruption of the main power supply source P, as shown in FIG. 1, the engine-generator E-G is driven by an instruction signal generated by the undervoltage relay RY so that the switch S is automatically changed to the contact b thereby supplying the output of the engine-generator E-G to the inverter IV and thus the load L.

According to the present invention, even though there is an occurrence of failure of the rectifier Rec or trip of overcurrent breaker, the operation of the system can be made continuous without stop thereof and thus failure of the battery B can be avoided.

Figure 3:
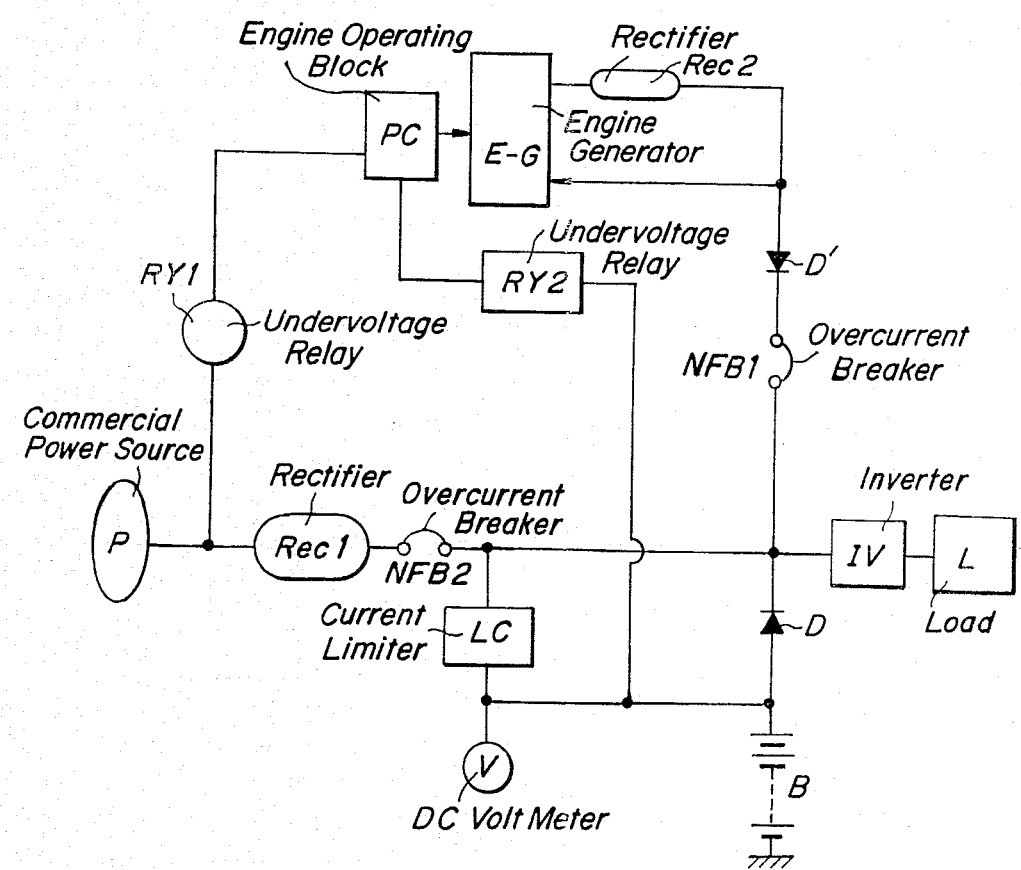
FIG. 3 is a block diagram showing another embodiment of a no-break power supply system according to the present invention.

FIG. 3 shows another embodiment of a no-break power supply system according to the present invention. In FIGS. 3 and 2, the same reference numerals and letters are used for corresponding components and its constructional explanation is omitted.

In this embodiment, the system comprises a series combination of a second rectifier Rec 2, a diode D1 and an overcurrent breaker NFB2 which is connected between the engine-generator E-G of an emergency generator means and the inverter IV. The system also comprises a floating charge means which includes a second diode D2 connected between the inverter IV and the battery B and a current limiter Lc with a DC voltage meter V connected in parallel with the second diode D2 and for preventing overcurrent to the battery B. The floating charge means also comprises the first rectifier Rec 1 which serves as a rectifier for the inverter IV. The engine-generator E-G comprises an engine and a general three phase AC generator having four poles which is driven by the engine. The generator is driven at speed two times the rated speed. The engine is operated by an instruction signal from the engine operating means PC which is triggered by the undervoltage relays RY1 and RY2. The relay RY1 is connected between the main power supply source P and the engine operating means PC and the relay RY2 is connected between the battery B and the engine operating means PC. The relay RY2 monitors the voltage of the battery B to supply an instruction signal to the engine operating means PC when the voltage of the battery B becomes lower than a predetermined value and the rectifier Rec1 becomes failed.

In operation, under normal power transmission, the undervoltage relay RY1 does not operate and not supply the instruction signal to the engine operating means PC so that the engine-generator does not operate and thus the inverter IV receives the DC current from the main power supply source P through the rectifier Rec1. This DC current is also supplied to the emergency battery B through the current limiter Lc thereby charging the battery B in the floating condition.

Under such a condition, when service interruption occurs the undervoltage relay RY1 detects this condition and supplies an instruction signal to the engine operating means PC so that the engine-generator E-G begins to operate. The output of the generator E-G is connected into a DC power by the rectifier Rec2 and supplies to the inverter IV through the first diode D1 and the overcurrent breaker NFB2. At the same time, this DC power is supplied to the battery B through the current limiter Lc thereby charging the battery B in the floating condition. this charging condition is held during service interruption so that the load L such as a computer is held at normal operating condition.

As soon as the main power supply source P is restored to the normal power transmission state the undervoltage relay RY1 detects this condition and stops to supply the instruction signal to the engine operating means PC so that the load L receives the power under the normal power transmission.

According to the present invention, as described above, use is made of a generator capable of operating at speed two times the rated speed as a generator E-G, thereby obtaining output voltage with a frequency two times the generated frequency so that the output of the rectifier Rec2 includes very small ripple resulting in a DC power with high quality and high efficiency. At the same time, the second diode D2 is inserted between the inverter IV and the battery B with reverse polarity so that the charging currents from the rectifiers Rec1 and Rec2 can not be directly supplied to the battery B but can be supplied to the battery B through the current limiter Lc which limits the charging current to a suitable amount, and thus the generator does not suffer abnormal overload condition. The battery B, furthermore, is connected to the engine operating means PC through the undervoltage relay RY2 so that under the normal power transmission, even though the rectifier Rec1 becomes failed suitable supply and charging by the engine-generator E-G can be performed.

What is clamed is:

1. A no-break power supply system comprising a switch connected to a main or commercial power supply source and having first and second contacts, a first rectifier means connected to the switch through an overcurrent breaker, an inverter connected to the first rectifier means for supplying an output with constant voltage and constant frequency to a load, an emergency generator means connected to the switch for generating a supply voltage in the case of service interruption or failure of components, an emergency battery means connected between the input of the inverter and a ground for supplying a voltage for short duration in the case of service interruption or failure of components, a second rectifier means connected in parallel with a series combination of the switch, the overcurrent breaker and the first rectifier, and a voltage relay means connected between the emergency generator means and the emergency battery means for starting up the emergency generator means in the event of a service interruption.

2. A no-break power supply system as claimed in claim 1, wherein the emergency generator means comprises an engine-generator connected to the second contact of the switch, an engine operating means connected to the engine for driving the engine-generator, and an undervoltage relay connected between the main supply source and the engine operating means for triggering the engine operating means.

3. A no-break power supply system as claimed in claim 1, wherein The first and second rectifier means serve also as a floating charge means for the emergency battery means.

4. A no-break power supply system comprising a first rectifier means connected to a main or commercial supply source, an inverter connected to the first rectifier through an overcurrent breaker and for supplying an output with constant voltage and constant frequency to a load, an emergency generator means connected between the main supply source and the inverter for generating a supply voltage for long duration in the case of service interruption or failure of components, an emergency battery means connected between the input of the inverter and a ground for supplying a voltage for short duration in the case of service interruption or failure of components, a floating charge means connected to a junction point of the first rectifier means, the emergency generator means and the inverter, an emergency battery means connected between the floating charge means and a ground for supplying a voltage for short duration in the case of service interruption or failure of components, and an undervoltage relay means connected between the emergency generator means and the emergency battery means for starting up the emergency generator means, in the event of a service interruption.

5. A no-break power supply system as claimed in claim 4, wherein The emergency generator means comprises an engine-generator driven at speed two times the rated speed, an engine operating means connected to the engine for driving the engine-generator, an undervoltage relay connected between the main supply source and the engine operating means for triggering the engine operating means, a second rectifier means connected to the output of the generator, and a series combination of a first diode and an overcurrent breaker which is connected between the second rectifier means and the inverter.

6. A no-break power supply system as claimed in claim 4, wherein, the floating charge means comprises a second diode connected be-tween the inverter means and the emergency battery means with antipolarity, and a current limiter connected between the first rectifier means and the emergency battery means in such a manner that it is connected in parallel with the second diode, and a DC voltage meter connected to the current limiter.

7. A no-break power supply system as claimed in claim 4, wherein the first rectifier means serves also as a floating charge means for the emergency battery means.

8. A no-break power supply system as claimed in claim 1 or 4, wherein the load is a computer.

* * * * *